United States Patent [19]

Fuller, Jr. et al.

[11] Patent Number: 4,773,816

[45] Date of Patent: Sep. 27, 1988

[54] APPARATUS AND METHODS FOR ENGAGING A WORKPIECE

[75] Inventors: Robert L. Fuller, Jr., Issaquah; David A. Yousko, Renton, both of Wash.

[73] Assignee: The Boeing Company, Seattle, Wash.

[21] Appl. No.: 761,980

[22] Filed: Aug. 2, 1985

[51] Int. Cl.[4] ........................ B65G 47/34; B65G 47/82

[52] U.S. Cl. .................................... 414/771; 118/503; 269/257; 414/405; 414/786

[58] Field of Search ................ 118/500, 503; 269/257, 269/271, 275; 414/786, 405, 758, 766, 771

[56] References Cited

U.S. PATENT DOCUMENTS

| | | | |
|---|---|---|---|
| 1,711,250 | 4/1929 | Purinton | 118/500 X |
| 2,370,698 | 3/1945 | Vaughn | 414/405 |
| 3,395,439 | 8/1968 | Palesi et al. | 269/275 |
| 3,902,512 | 9/1975 | Armstrong et al. | 118/500 |
| 4,295,776 | 10/1981 | Payne et al. | 414/766 |
| 4,483,269 | 11/1984 | Down | 118/503 |
| 4,572,850 | 2/1986 | Bailey | 118/500 X |

*Primary Examiner*—Frank E. Werner
*Assistant Examiner*—Janice Krizek
*Attorney, Agent, or Firm*—Hughes, Cassidy & Multer

[57] ABSTRACT

Inbound and outbound parallel conveyors carry parts supported on a screen tray engaged by the conveyors. The parts are conveyed to a station on the inbound conveyor line where a substance is applied to a first portion of the parts. The parts are then conveyed to an inverting apparatus which inverts the parts onto another tray screen so that the relative locations of the parts on the tray screen are maintained to prevent masking each other when the substance is applied to a second portion of the parts. The parts are then conveyed to another location where the upwardly disposed second portions of the parts receive a coating of the substance. The inverting operation is accomplished by the inverting apparatus, slideably engaged to a lateral mobile assembly, which engages the parts tray from the conveyor within a lower tray receptacle. The parts are clamped between the lower tray and an upper screen tray removably engaged in an upper tray receptacle. In order to fix the locations of differently sized parts on the tray during rotation and movement of the carrier frame, during the clamping operation, a compliant material such as vertical bristles, disposed above and below the tray screens, is displaced through the screen holes to engage the parts thereabout.

8 Claims, 10 Drawing Sheets

APPARATUS AND METHODS FOR ENGAGING A WORKPIECE

TECHNICAL FIELD

The present invention relates to apparatus and methods for engaging a workpiece, and more particularly to apparatus and methods for engaging and spatially reorienting a workpiece to accomplish an operation thereon such as applying a substance, such as paint, to the surface of the workpiece.

BACKGROUND OF THE INVENTION

The painting of mechanical parts may be accomplished by manually placing the parts on an underlying platform, applying paint to the exposed surfaces of the parts, allowing the parts to dry and then individually turning the parts over onto the platform and applying paint to the remaining unpainted portions. When painting a large number of parts, this procedure is very time consuming. In addition, the procedure is expensive because typically the parts are inverted by hand.

Conventional apparatus and methods have been disclosed for engaging and supporting a workpiece. In U.S. Pat. No. 3,681,835—Evans, et al, there is disclosed a wire mesh jig board for preparing electronic assemblies including a pair of spaced apart parallel screens which are adapted to receive pin pairs therethrough for engaging an electronic cable to the board.

In U.S. Pat. No. 4,121,817—Pavlovsky, there is disclosed an apparatus for engaging an irregularly shaped workpiece including a lower support plate having holes therein arranged to receive vertical support members of various heights to support a workpiece for retention thereof in a fixed relationship with a support plate by an upper opposing clamp.

In U.S. Pat. No. 3,463,478—Hennessey, there is disclosed an apparatus for supporting a workpiece in a selected position including a base having openings for receiving pins therein which support the workpiece at a desired orientation relative to the base.

In U.S. Pat. No. 4,098,046—Papa, there is disclosed a guide frame for the retention of slideable articles wherein the guide frame includes top and bottom members each having opposing cantilevered ribs terminating in opposing parallel spaced apart bars which form top and bottom channels for receiving and engaging the article therein.

In U.S. Pat. No. 2,621,807—Rendich, there is disclosed an apparatus for positioning and retaining display devices including a base member having spaced apart openings therein for receiving support members at predetermined locations to engage and accurately position a display device on the base.

In U.S. Pat. No. 3,559,980—Terai, et al, there is disclosed a system for adjusting the position of a plurality of jigs for supporting several workpieces in proximate relationship prior to welding the workpieces together wherein the controller moves the jigs vertically to form a support conforming to the shape of the workpiece for receiving the workpiece thereon.

In U.S. Pat. No. 3,175,820—Schiler, there is disclosed a rotary table for rotatably supporting workpieces thereon wherein threaded support elements are vertically adjusted relative to the table to receive and support the workpiece thereon.

In U.S. Pat. No. 3,178,168—Abernathy, there is disclosed an apparatus for positioning and supporting a container including a base having receptacles therein for receiving and supporting upright dowels to receive an inverted box thereon in order to perform operations on the box.

In U.S. Pat. No. 3,181,858—Daniels, there is disclosed a support for a workpiece including a plurality of yielding members which are resiliently biased to a vertical position, but which yield to a portion of the workpiece extending below the plane thereof when the workpiece slides across the top of the support, and then which return to an erect position.

In U.S. Pat. No. 3,442,251—Perkel, there is disclosed an apparatus for coating articles including a container having a rotary shaft supporting opposing adjustable arm members forming a grid structure for engaging the articles therebetween, and a sprayer assembly for applying a solution to the article as it is rotated in the container.

SUMMARY OF THE INVENTION

In order to avoid performing each step of the painting process manually, automated equipment may be used to increase the speed of the painting operation and reduce the concurrent expense. It is proposed herein to place the parts individually on a first conveyor which supports the parts and carries them to a first painting location where paint is applied to the exposed surfaces. The parts are dried and then automatically inverted onto a second conveyor which carries the parts back to the first location, or to a second painting location where paint is applied to the unpainted surfaces. It is desirable, therefore, to automatically remove the partially painted parts from the first conveyor, invert the parts, and then place the parts onto the second conveyor so that the painting can be completed. It is also desirable that during the inversion process, each part retain its location relative to the other parts so that the parts are not covering each other when being painted. However, the designated parts to be painted may be of different sizes and shapes wherein some extend upwardly to different vertical heights. It is desirable, therefore, that these parts of varying sizes and shapes be automatically removed from a conveyor assembly, engaged and inverted in such a manner so that they retain their relative locations.

The present invention, therefore, comprises apparatus for engaging a workpiece having first and second surfaces. The apparatus includes first and second workpiece engaging means disposed in a spaced apart relationship. The first engaging means has a first surface, a second surface, and at least one through opening extending between the first and second surfaces. The apparatus also includes means for positioning the first and second engaging means to engage the first and second surfaces, respectively, of the workpiece between the second surface of the first engaging means and the second engaging means. Also included are means to move compliant means through the opening at the first surface of the first engaging means in a first direction such that the compliant means extends through the opening and beyond the first surface of the second engaging means to engage the workpiece. The first engaging means includes resilient means disposed between a noncompliant portion of the compliant means and the first surface of the first engaging means so that the movement of the compliant means in the first direction engages the resilient means between the compliant means and the first engaging means to cause corresponding movement of the first engaging means in the first direction to engage the workpiece between the first engaging means and the second engaging means thereby restricting further movement of the first engaging means in the first direction. The movement of the compliant means continues in the first direction to cause (i) compression of the resilient means between the noncompliant portion and the first surface, and (ii) penetration of the compliant means through the opening extending between the first and second surfaces.

The invention also comprises apparatus for engaging and rotating a workpiece, having first and second surfaces, so that a surface operation can be perforated on the first and second surfaces. The apparatus comprises first and second workpiece engaging means disposed in a spaced apart relationship. The first engaging means includes a first surface, a second surface, and at least one through opening extending between the first and second surfaces. Also included are means for positioning the first and second engaging means, after a surface operation has been performed on the first surface of the workpiece, to engage the first and second surfaces, respectively, of the workpiece between the second surface of the first engaging means and the second engaging means. Means are included for moving a compliant means operatively connected to the first engaging means, in a first directiŏn through the opening at the first surface of the first engaging means in a manner that the compliant means extends through the opening and beyond the surface to engage the workpiece and to hold the workpiece securely relative to the first and second engaging means. The apparatus also includes means for rotating the first and second engaging means and the compliant means in engagement with the workpiece, to invert the workpiece; and means for moving the compliant means away from the workpiece so that the compliant means is disengaged from the workpiece. Also included are means for positioning the first and second engaging means to disengage the workpiece from between the second surface of the first engaging means and the second engaging means in preparation for performance of a surface operation on the second surface.

In an exemplary embodiment, the present invention comprises apparatus for engaging and rotating a workpiece having first and second surfaces so that a surface operation can be performed on the first and second surfaces. The workpiece is removably supported on a first surface of a platform also having a second surface, and at least one through opening extending between the first and second surfaces thereof. The apparatus includes first platform engaging means for removably engaging the platform after a surface operation has been performed on the first surface of the workpiece. Workpiece engaging means are disposed in a spaced apart relationship from the platform engaging means. The apparatus also includes means for positioning the platform engaging means and the workpiece engaging means to engage the first and second surfaces of the workpiece; as well as means for moving compliant means, operatively connected to the platform engaging means, in a first direction through the opening at the first surface of the platform in a manner that the compliant means extends through the opening and beyond the second surface of the platform to engage the workpiece and to hold the workpiece securely relative to the platform and the workpiece engaging means. Also included are means for rotating the platform engaging means, the workpiece engaging means and the compliant means to invert the workpiece. Means are included for moving the compliant means away from the workpiece so that the compliant means is disengaged from the workpiece, as well as means for positioning the first and second engaging means to disengage the workpiece from between the platform and the workpiece engaging means to permit the platform to be disengaged from the platform engaging means in preparation for performance of a surface operation on the second surface of the workpiece.

The compliant means and the first and second engaging means may be slidably engaged to a support member of a frame means. The workpiece engaging means includes a second platform engaging means for removably engaging a second platform having first and second surfaces and at least one through opening extending between the first and second surfaces of the second platform. Rotation of the frame member and inversion of the workpiece causes the workpiece to be supported on the second platform in preparation for disengaging the second platform from the second platform engaging means in preparation for performance of said surface operation on said second surface of said workpiece.

The present invention also includes a method for engaging a workpiece comprising the steps of placing first and second workpiece engaging means in a spaced apart relationship from the workpiece, the first workpiece engaging means having a first surface, a second surface and at least one through opening extending between the first surface and the second surface. The first and second engaging means are positioned to engage the first and second surfaces, respectively, of the workpiece between the second surface of the first engaging means and the second engaging means. Compliant means are moved in a first direction through the opening at the first surface of the first engaging means in a manner that the compliant means extends through the opening and beyond the second surface to engage the workpiece and to hold the workpiece securely to the first and second engaging means.

The present invention also comprises a method for applying a substance to a workpiece. The method comprises the steps of locating the workpiece on a first support member at a first selected orientation of the workpiece wherein a first portion of the workpiece is oriented toward the first support member, and a second portion of the workpiece is oriented away from the first support member. The workpiece is automatically conveyed to a first location for applying the substance to the second portion of the workpiece. The method also includes the steps of automatically receiving the first support member and engaging the workpiece between the first support member and a second support member so that the second portion of the workpiece is oriented against the second support member. The first support member, the second support member and the workpiece are automatically inverted to a second selected orientation wherein the second portion of the workpiece is supported on the second support member, and the first portion is oriented away from the second support member. The workpiece is automatically disengaged from between the first support member and the second support member, and the second support member automatically removed and the workpiece is conveyed to the first location for applying the substance to the first portion of the workpiece.

It is therefore an object of the present invention to provide apparatus and methods for engaging a workpiece.

BRIEF DESCRIPTION OF THE DRAWINGS

These and other objects and advantages of the present invention will become more readily apparent upon reading the following detailed description and upon reference to the attached drawings in which:

FIGS. 6A through 6D are semi-schematical representations of the inverter assembly wherein FIG. 6A shows the inverter assembly in an unclamped position after engaging a lower first screen tray from the first conveyor, FIG. 6B shows the inventer assembly clamping parts between the lower first screen tray and an upper second screen tray, FIG. 6C shows the inverter assembly after inversion so that the parts now are supported on the second screen tray occupying the "lower" portion, and FIG. 6D shows the inverter assembly in an unclamped position in preparation for the second screen tray to be engaged by the second conveyor;

Figure 1:
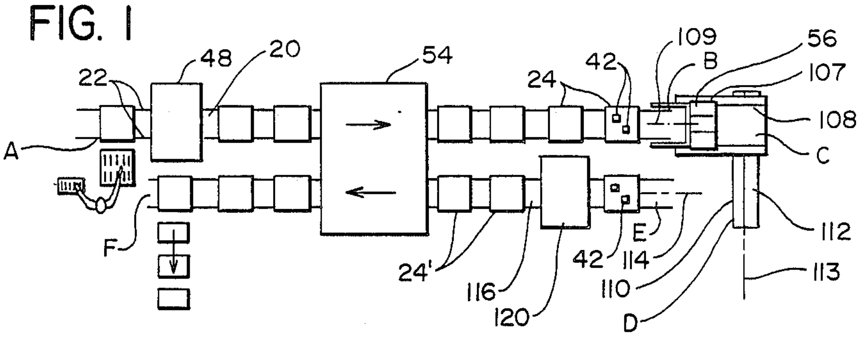
FIG. 1 is a simplified overhead view of a parts painting assembly line including an inverter assembly for inverting the parts, a lateral mobile assembly for supporting the inverter assembly for travel thereon in transferring the parts between conveyor lines, and a main support assembly for supporting the lateral mobile assembly during lateral travel between a first conveyor line and a second conveyor line.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

Figure 2:
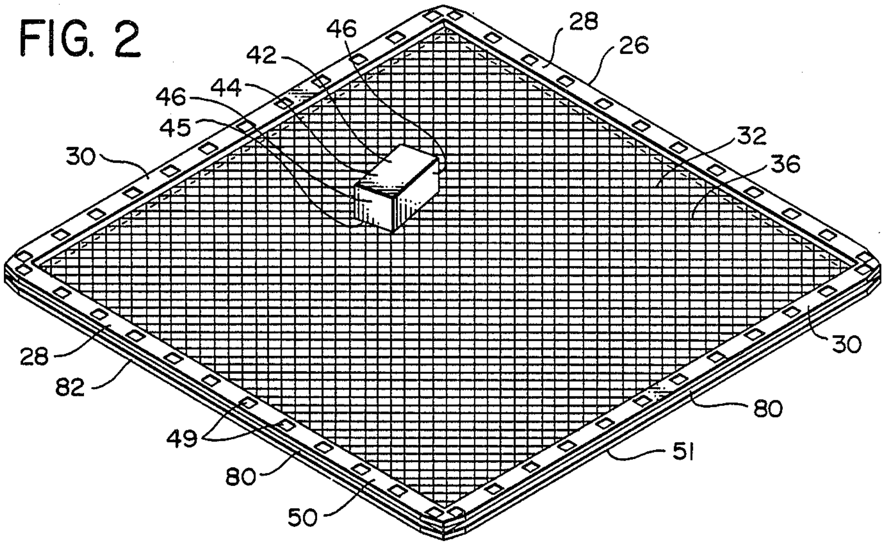
FIG. 2 is an isometric view of a parts tray supporting exemplary parts thereon.
Figure 3:
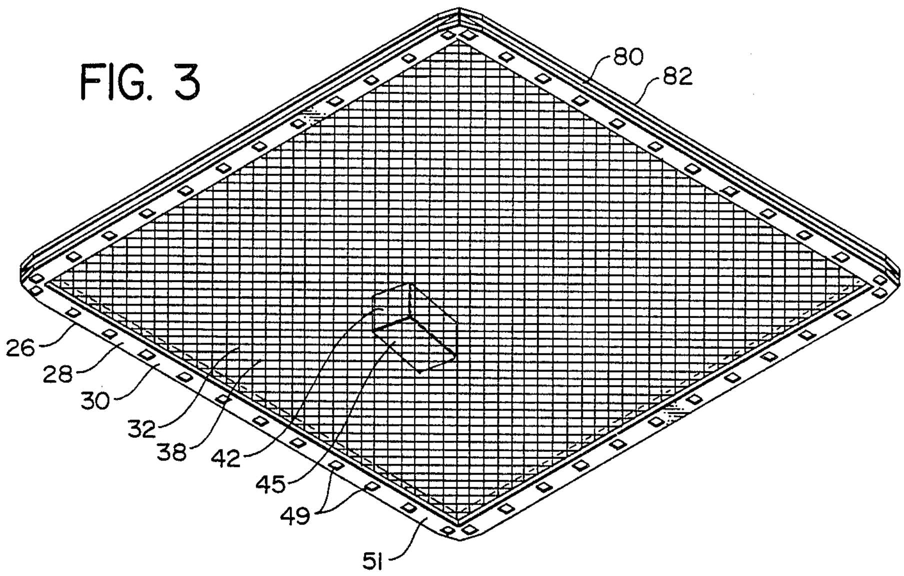
FIG. 3 is a bottom view of the parts tray supporting exemplary parts thereon.
Figure 4A:
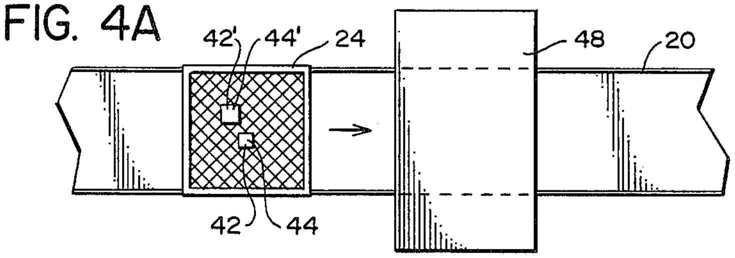
FIGS. 4A through 4F are semi-schematical drawings illustrating various positions of the parts tray, inverter assembly and lateral mobile assembly when inverting and when transferring parts between conveyor lines.
Figure 4B:
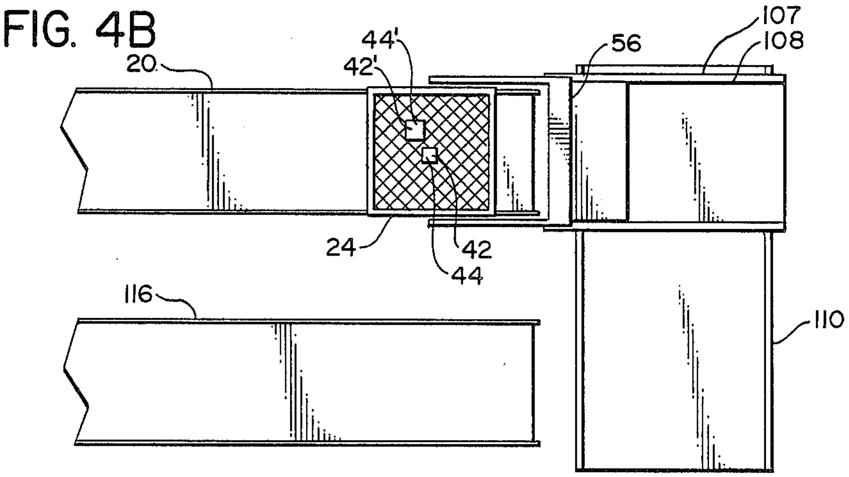

Referring to FIGS. 1 through 3 there is shown an exemplary embodiment of the present invention comprising a conveyor assembly for carrying trays supporting small parts to be painted. The conveyor assembly includes an inbound conveyor 20 having spaced apart parallel conveyor chains 22 adapted to receive a plurality of trays 24 thereon. Each tray 24 (FIG. 2) includes a rectangular tray frame 26 having opposing parallel longitudinal members 28, and opposing parallel lateral members 30, which engage a screen mesh 32 therebetween; screen mesh 32 having a first surface 36 and an opposing surface 38 (FIG. 3). Tray 24 receives parts 42, mechanically, or manually as shown pictorially in FIG. 1, onto first surface 36, and tray 24 is then placed onto conveyor 20 to convey parts 42 for painting downline thereof. Each part 42 (FIG. 2) includes a first upper portion 44 which is exposed for painting, a second lower portion 45 (FIG. 3) which is disposed against screen upper surface 36, and sides 46 between first portion 44 and second portion 45. Trays 24, including part 42 and a larger part 42' (FIG. 4), are transferred onto inbound conveyor 20 at a station A shown in FIG. 1, and engaged therewith to be conveyed through a first painting compartment 48 as shown in FIG. 4A where the upwardly directed exposed portions 44, 44' and sides 46, 46' of parts 42, 42' are painted. Tray frame 26 includes slotted receptacles 49 at opposing surfaces 50, 51 thereof which are adapted for engaging conveyor chain 22 in a manner to be described later in order to secure tray 24 to conveyor chains 22. After the exposed portions of parts 42, 42' have been painted, tray 24 is then conveyed into an oven compartment 54 where the painted surfaces of parts 42, 42' are dried. After parts 42, 42' have been dried, tray 24 is conveyed downline to an inverter assembly 56 which is slideably engaged to a lateral mobile assembly 107. Tray 24 moves horizontally movement, when viewing FIG. 1, along an axial centerline 109 of conveyor line 20 from left to right. Inverter assembly 56 then moves in a leftward direction, when viewing FIG. 1, along centerline 109 toward conveyor line 20 to an "engaged" position at a station B proximate to an end of conveyor line 20 as shown in FIGS. 1 and 4B to feet and receive tray 24 therewithin.

Figure 4C:
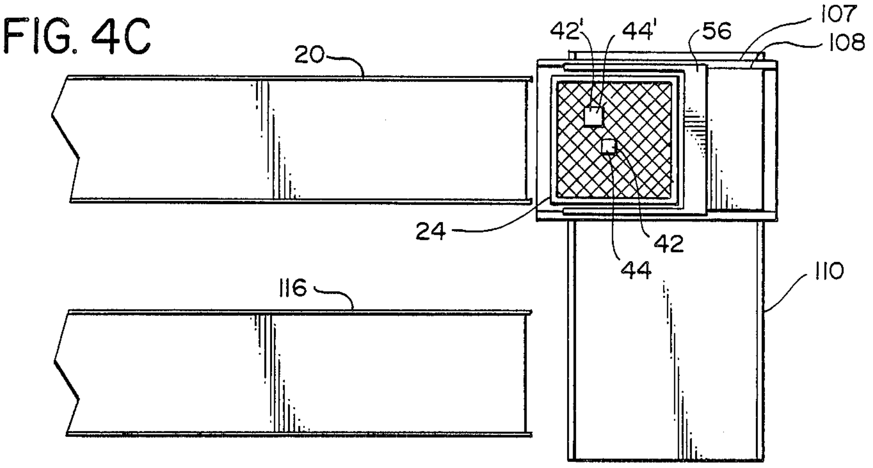
Figure 4D:
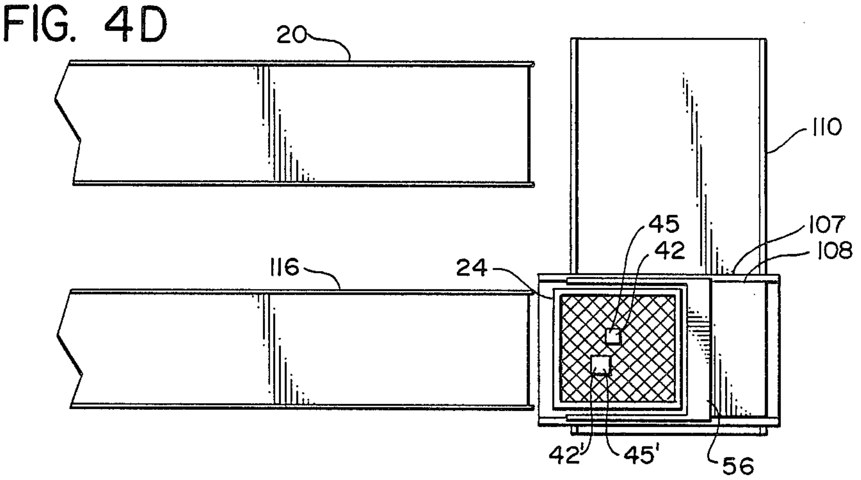
Figure 4E:
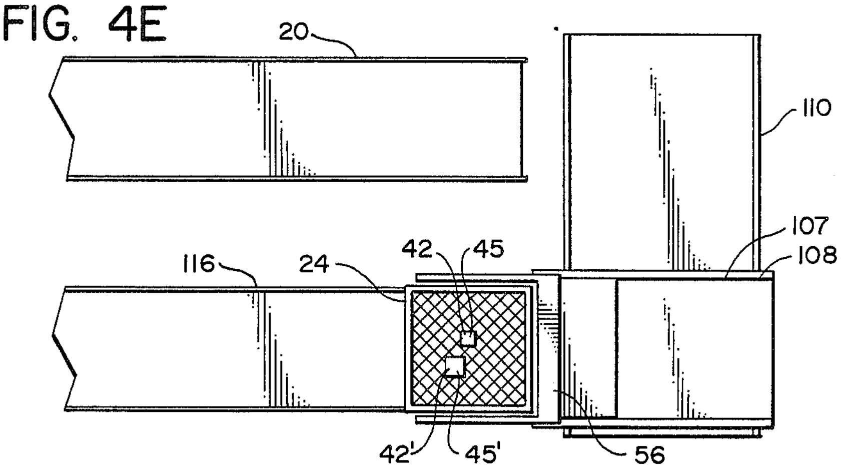
Figure 4F:
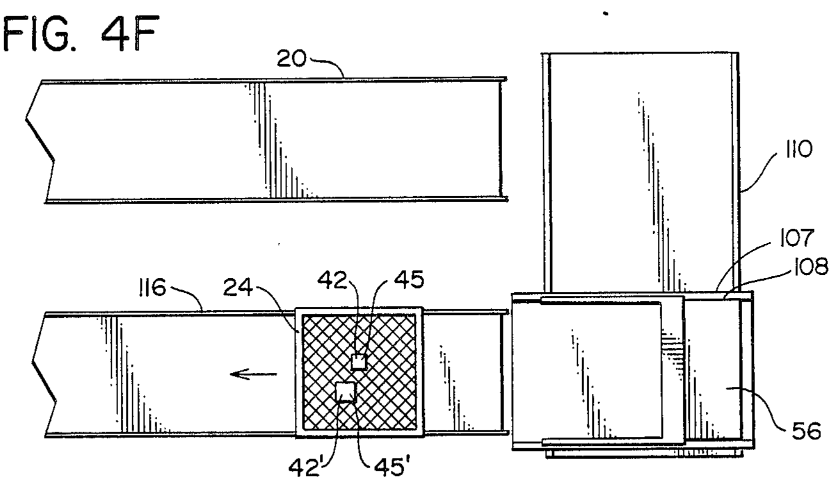

After engaging tray 24, inverter assembly 56 moves in a rightward direction along centerline 109, when viewing FIG. 1, away from conveyor line 20 to a station C shown in FIGS. 1 and 4C. At station C, inverter assembly 56 is rotated about axis 109 through 180° of travel in order to invert parts 42 so that parts 42, 42' are supported on a tray 24' which prior to inversion was located above tray 24. In this manner and second portions 45, 45' of parts 42, 42' are oriented in an upward direction. Lateral mobile assembly 107, which is slideably engaged to a fixed main support assembly 110 along an axis 113 perpendicular to axis 109, is then moved in a downward direction, when viewing FIG. 1, along axis 113 to a station D shown in FIGS. 1 and 4D. At station D inverter assembly 56 is aligned with an axial centerline 114 of a second outbound conveyor 116 which is spaced apart from and parallel to first conveyor line 20 and which is movable in both a right to left direction and left to right direction. Inverter assembly 56 then moves in a leftward direction along axis 114 toward conveyor line 116 to a station E proximate to an end of conveyor 116 and shown in FIG. 4E, where tray 24' supporting parts 42, 42' is engaged by conveyor 116. Inverter assembly 56 then returns to station D as shown in FIG. 4F, and tray 24' is carried in a right to left direction by conveyor line 116 through a second painting compartment 120. The upwardly oriented, unpainted portions 45, 45' of parts 42, 42' are painted in painting compartment 120 and then conveyed further downline on tray 24' by conveyor 116 to oven 54 where parts 42, 42' are dried. After drying, the parts 42, 42' are carried downline on tray 24' by conveyor 116 to station F where tray 24' and parts 42, 42' are unloaded from conveyor line 116. All operations described herein are automatically performed, except for loading parts 42, 42' onto tray 24, and loading tray 24 onto conveyor line 20 at station A, and removing tray 24' from conveyor line 116 at station F. If desired, these operations may also be accomplished automatically by machinery which is not part of the present invention. lateral mobile assembly 107 and inverter assembly 56 then return to station C in preparation for receiving the next tray 24 carrying parts thereon.

Figure 5:
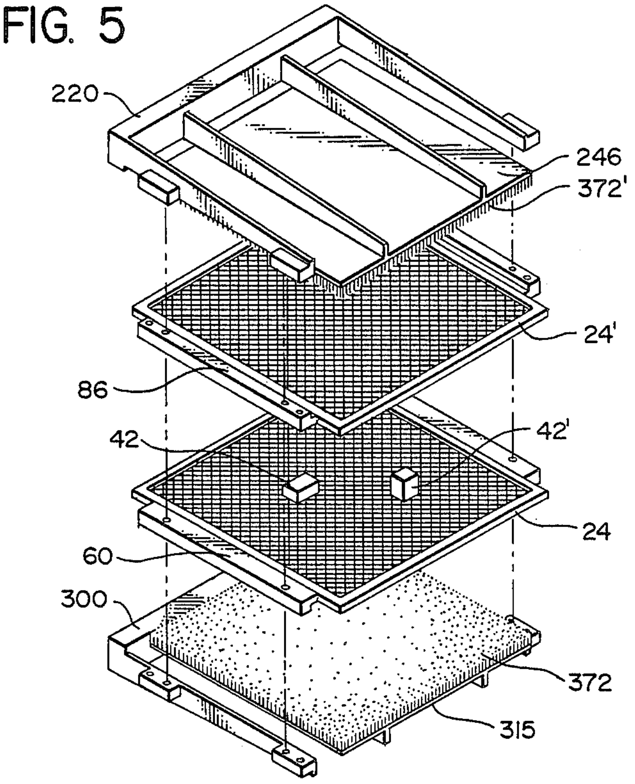
FIG. 5 is a simplified isometric view of the inverter assembly in an "unclamped" configuration.

Referring to FIGS. 5 and 6, a brief introduction to inverter assembly 56 is provided in order to understand the inversion operation at station C more clearly. FIGS. 5 and 6 show a simplified embodiment of inverter assembly 56 which will be described in more detail later. It should be appreciated that in describing the components of the present invention, their relative positions defined as "upper" and "lower", when viewing FIGS. 2 through 6, will be used to provide a clearer description, with the understanding, however, that after inversion of these components, the descriptive labels "upper" and "lower" will no longer be descriptive of their relative positions. When at station B, inverter assembly 56 receives tray 24 from conveyor 20 for engagement in a first lower tray receptacle 60. The second upper screen tray 24' is removably slideably engaged in a second tray receptacle 86 of inverter assembly 56. A clamping action is provided by upward vertical movement of tray 24 and downward vertical movement of tray 24' to hold parts 42, 42' therebetween. Clamping movement of trays 24, 24' is halted, as shown in FIG. 6, by engagement with part 42'. In order to prevent differently sized parts 42, 42' from moving during movement of inverter assembly 56, a first compliant material 372 and a second compliant material 372', such as vertical bristles, are displaced through holes in screens 32, 32', as shown in FIG. 6B, to engage parts 42, 42' therebetween. Clamping movement of trays 24, 24' results from vertical movement of tray receptacles 60, 86. Compliant materials 372', 372 are supported from upper, lower support bases 246, 315, respectively. Upper support base 246, including compliant material 372', is disposed above tray 24' and is attached to an upper platen 220 therabove. Lower support base 315, including compliant material 372, is disposed below tray 24 and attached to a lower platen 300 therebelow. Movement of upper, lower platens 220, 300 in the "clamped" direction is initiated by a rack and pinion (not shown in FIGS. 5 and 6A through 6D). Vertical clamping forces are imparted to tray receptacles 86, 60 by vertical movement of upper, lower platens 220, 300. When screens 32', 32 engage part 42' having the greatest vertical height, movement of screen trays 24', 24 and tray receptacles 86, 60 is halted. However, further clamping movement of platens 220, 300 and support bases 246, 315 including compliant material 372', 372 therewith, is permitted to allow penetration of compliant material 372', 372 through the holes in screens 32', 32 and about parts 42, 42' in a "clamped" position.

Figure 6A:
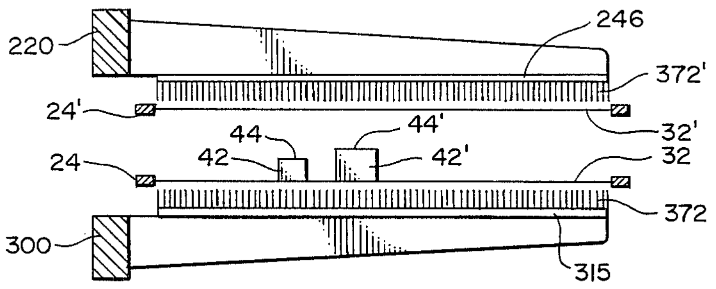
Figure 6B:
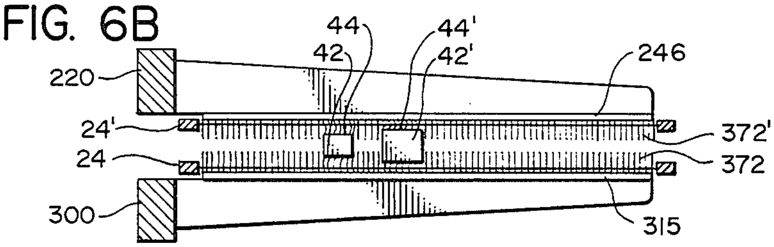
Figure 6C:
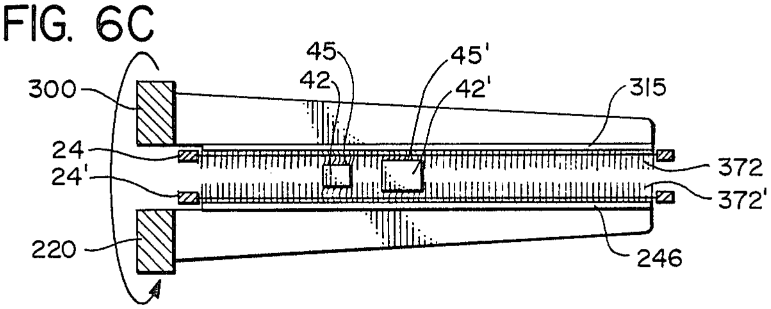
Figure 6D:
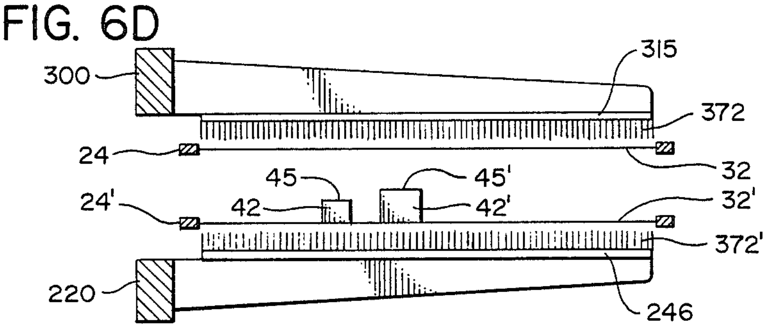

When in the "clamped" position, inverter assembly 56 is then rotated 180° to an inverted position as shown in FIG. 6C. The compliant material 372', 372 engages parts 42, 42' to prevent their movement during rotation of inverter assembly 56. After inversion, platens 220, 300 are moved by the rack and pinion assembly vertically away from each other, causing screen trays 24', 24 and compliant materials 372', 372 to separate to locations shown in FIG. 6D. In the newly inverted position, screen tray 24' supports parts 42, 42'. Screen 24' is then engaged by conveyor 116 and slideably removed from tray receptacle 86 for conveyance downline by second conveyor line 116. Therefore, when inverter assembly 56 returns to station B (FIG. 1) to receive another tray from first conveyor line 20, tray receptacle 86 now occupying the lower position is empty in preparation to receive the next tray from conveyor line 20. In addition, screen tray 24, engaged by tray receptacle 60, is located above the newly received tray to provide a clamping means for the newly received parts.

In an exemplary embodiment, compliant material 372, 372' comprises bristles, made out of nylon or the like, which extend vertically through the holes in screens 32, 32', respectively, from support bases 315, 246, respectively, in the "clamped" position. The bristles extend in a vertical direction adjacent to sides 46, 46' of part 42, 42', respectively, and engage upper, lower surfaces 44, 45 and upper, lower surfaces 44', 45'. As discussed previously, the part 42' having the greatest vertical height is held in position between screens 32, 32' with additional lateral support provided by the penetration of compliant material 372, 372'. The smaller part 42 is engaged at lower surface 45 and upper surface 44 by compliant material 372, 372', respectively, which in addition engages part 42 at sides 46 thereof. It can be appreciated that the type of compliant material 372, 372' will depend upon the length of penetration required to engage the smaller parts 42. When the parts 42, 42' are generally of the same vertical height, a compliant material such as rubber may provide sufficient penetration to reach upper surface 44, lower surface 45 ahd sides 46. However, when parts 42, 42' are of different vertical heights, a bristle-type compliant material may be more suitable to provide the depth of penetration to engage upper surface 44, lower surface 45 and sides 46. Although parts 42, 42' have been described herein and shown in the drawings, the present invention contemplates that numerous parts of varying sizes, shapes and vertical heights will be supported on screens 32, 32' for operations described in the present invention.

Figure 7:
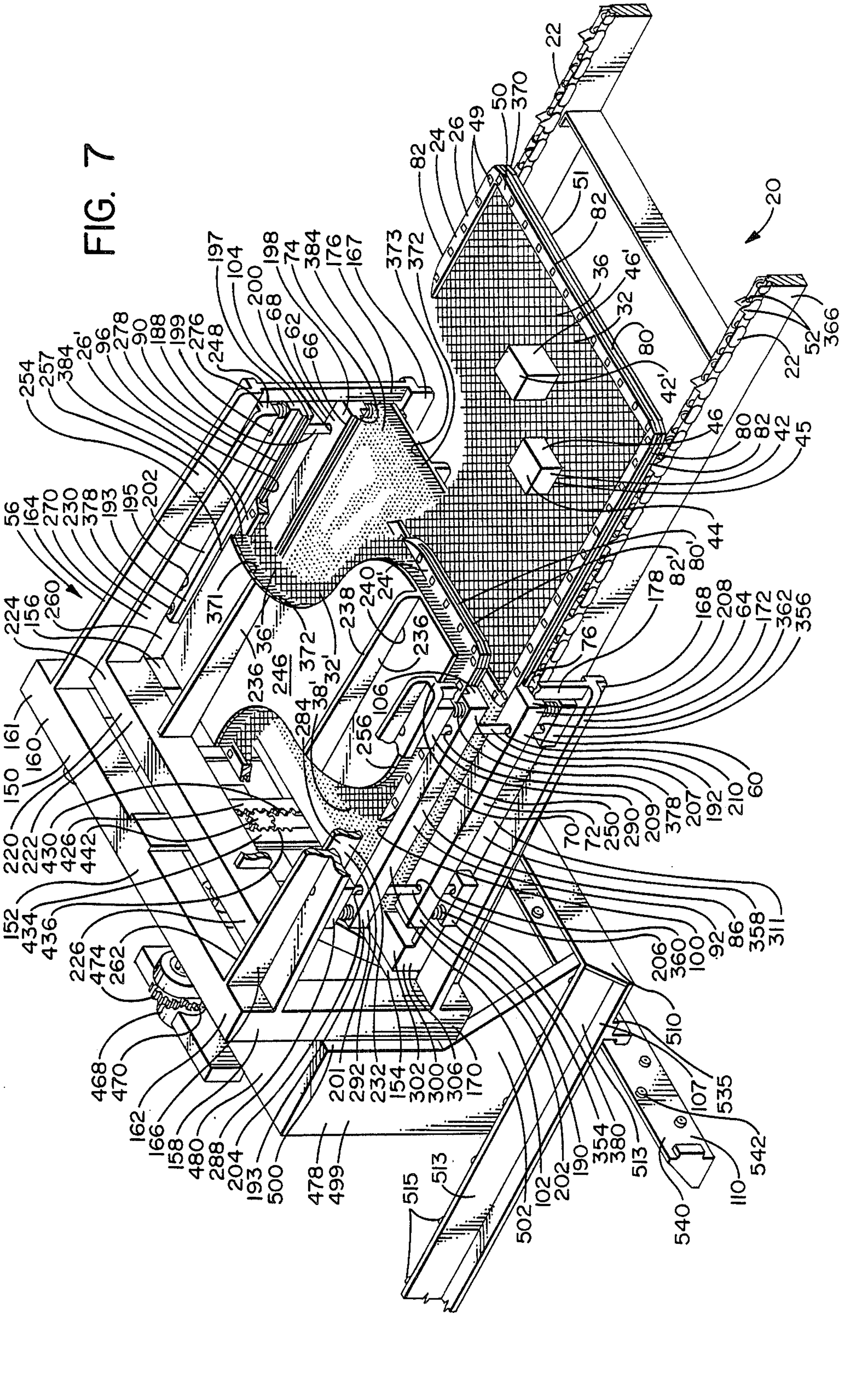
FIG. 7 is an isometric view of the inverter assembly showing a screen tray partially engaged within the inverter assembly.

In order to describe the present invention in more detail, reference is made to FIG. 7 where inverter assembly 56 includes first lower tray receptacle 60 having opposing horizontally disposed parallel lower support ledges 62, 64 which have respective inner, outer surfaces 66, 68 and 70, 72. Guide rails 74, 76 are disposed longitudinally along inner surfaces 66, 70, respectively, for engaging a slotted channel 80 disposed about the perimeter of tray 24 along sides 82 thereof. Inverter assembly 56 includes second upper tray receptacle 86 disposed above first tray receptacle 60 and comprising parallel horizontally disposed upper support ledges 90, 92; support ledge 90 having an inner surface 96 and an outer surface (not shown); support ledge 92 having an inner surface 100 and an outer surface 102. Upper support ledge 90 is disposed in a parallel relationship above lower support ledge 62; likewise upper support ledge 92 is disposed in a parallel relationship with lower support ledge 64. Guide rails 104, 106 are disposed longitudinally along respective inner surfaces 96, 100 for engaging slotted channel 80' disposed about the perimeter of tray 24′ along sides 82′ thereof. Tray 24′ includes a tray frame 26′ for supporting a screen mesh 32′ having a first upper surface 36′ and a second lower surface (not shown). Upon receipt of tray 24 within first tray receptacle 60, first tray receptacle 60 is caused to move in an upward vertical direction while second tray receptacle 86 is caused to move in a downward vertical direction to engage part 42 rigidly therebetween in a "clamped" position.

Inverter assembly 56 includes a carrier frame 150 having rear upper and lower horizontal support members 152, 154 which are joined at opposite ends thereof by rear vertical supports 156, 158 to form a rear frame 160. Perpendicularly disposed to rear frame 160 at opposite upper ends 161, 162 thereof are upper forwardly extending sidearms 164, 166, respectively. Frame 150 also includes lower forwardly extending sidearms 167, 168 which are perpendicularly disposed to rear frame 160 below upper sidearms 164, 166, respectively, at opposite lower ends 169, 170 (FIG. 10), respectively, of frame 160. Upper, lower sidearms 164, 167 (FIG. 7) and upper, lower sidearms 166, 168, respectively, are joined at the respective distal ends thereof by vertical support members 176, 178.

Figure 9:
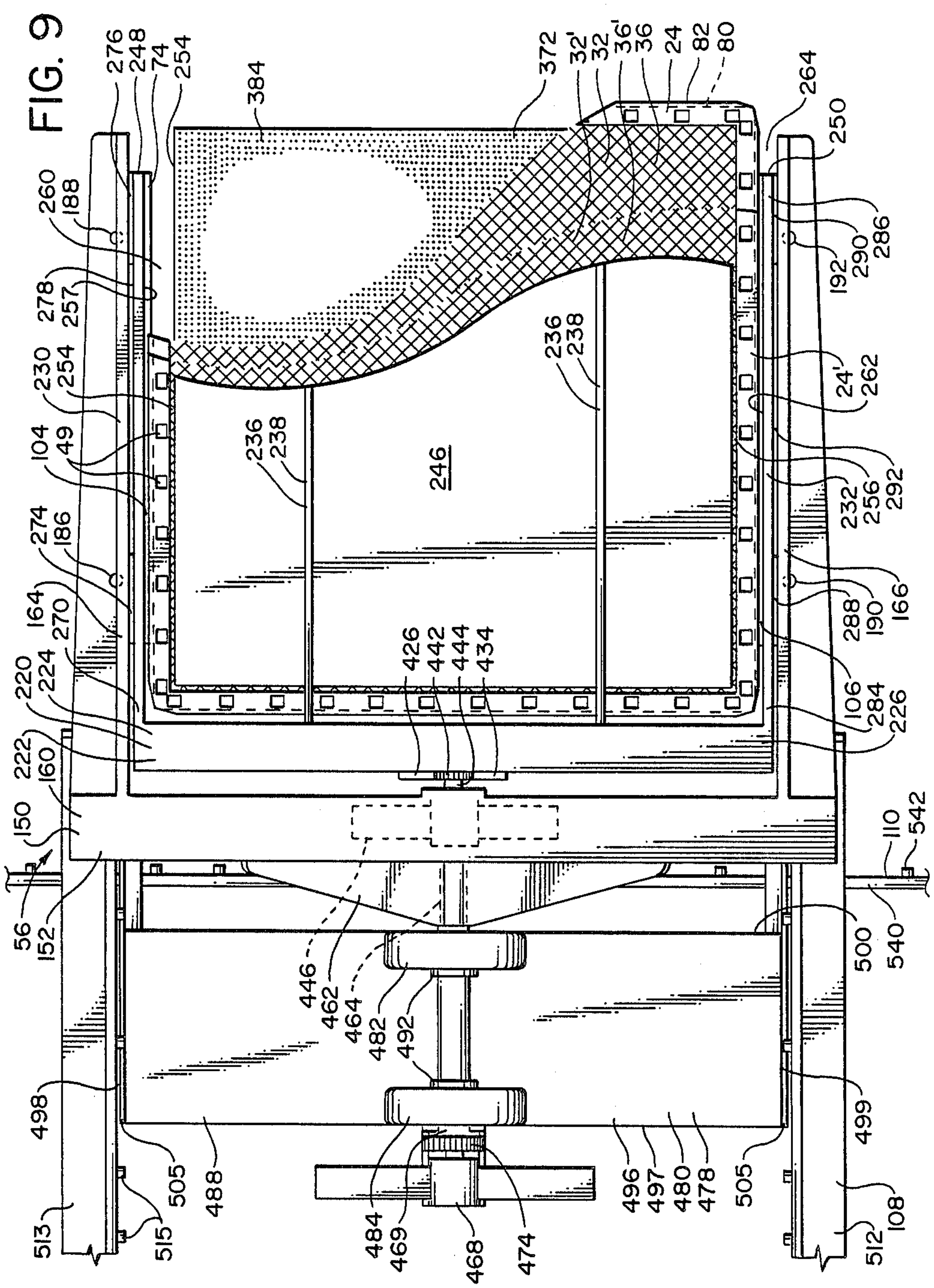
FIG. 9 is a top view, showing the inverter assembly and lateral mobile assembly, partially cut away to show a screen tray and compliant material.

In order to guide and support tray receptacles 60, 86 in their vertical travel between the "clamped" and "unclamped" positions, carrier frame 150 includes a rearward vertical guide shaft 186 (FIG. 9) and a forward vertical guide shaft 188 (FIG. 7) engaged vertically between upper, lower carrier sidearms 164, 167; and a rearward vertical guide shaft 190 and a forward vertical guide shaft 192 engaged between upper, lower carrier sidearms 166, 168. Upper support ledge 90 at rear portion 193 thereof includes a passageway 195. Passageway 195 and the rear portion passageway of lower support ledge 62 are axially aligned to receive rear guide shaft 186 therethrough for vertical slideable engagement therewith. Forward portions 197, 198 of upper, lower support ledges 90,62, respectively, include passageways 199, 200, respectively, which are axially aligned to receive guide shaft 188 therethrough for vertical slideable engagement therewith. Likewise, upper, lower support ledges 92, 64 at rear portions 201, 202, respectively, include passageways 204, 206, respectively, which are axially aligned to receive rear guide shaft 190 therein for vertical slideable engagement therewith; and upper, lower support ledges 92, 64 at forward portions 207, 208, respectively, (FIG. 7) include passageways 209, 210 which are axially aligned to receive forward guide shaft 192 for vertical slideable engagement therewith.

Referring to FIG. 7, in order to impart a clamping force to upper, lower tray receptacles 86, 60, inverter assembly 56 includes upper platen 220 having a rear support member 222 disposed in lower parallel relationship to upper horizontal support 152 of rear frame 160 and extending transversely between and proximate to upper sidearms 164, 166. Extending forwardly from rear support member 222 at opposite ends 224, 226 thereof, are platen upper support arms 230, 232, respectively, disposed parallel to and inboard of carrier upper sidearms 164, 66, respectively, and extending longitudinally approximately the length thereof. Disposed inboard of platen support arms 230, 232 and extending forwardly from platen rear support member 222 are support members 236; each longitudinal platen support member 236 having an upper surface 238 and a lower surface 240. Attached to lower surface 240 of platen support members 236 is an upper planar base member 246 Planar base member 246 extends longitudinally proximate to ends 248, 250 of upper sidearms 164, 166, respectively, and extends laterally substantially the distance between support arms 230, 232, terminating at planar base member ends 254, 256, respectively. Base member end 254 (FIG. 9) is spaced inward from an imaginary plane extending vertically downward from an inner surface 257 of carrier sidearm 164 to define a channel 260; likewise planar base member end 256 is spaced inward from an imaginary plane extending vertically downward from an inner surface 262 of carrier sidearm 166 to define a channel 264. Channels 260, 264 are sized to receive conveyor chains 22 and conveyor drive sprockets 265 (FIG. 8), disposed in rotatable engagement therewith, when inverter assembly 56 is in the "clamped" position.

In order to slideably engage upper platen 220 (FIG. 7) to guide shafts 186, 188, 190, 192 between upper carrier sidearms 164, 166 and tray upper support ledges 90, 92, respectively, platen upper support arm 230, at rear, forward ends 270, 248, respectively thereof, includes guide blocks 274 (FIG. 9), 276 (FIG. 7), respectively, which are attached to an outer surface 278 of platen support arm 230. Guide blocks 274, 276 include passageways (not shown) vertically therethrough for engaging guide shafts 186, 188, respectively, for vertical slideable movement thereon. Likewise, platen upper support arm 232 (FIG. 7), at rear, forward ends 284, 286 (FIG. 8), respectively thereof, include guide blocks 288, 290, attached to outer surface 292 thereof. Guide blocks 288, 290 include passageways (not shown) vertically therethrough for engaging guide shafts 190, 192, respectively, for vertical slideable movement thereon.

Figure 11:
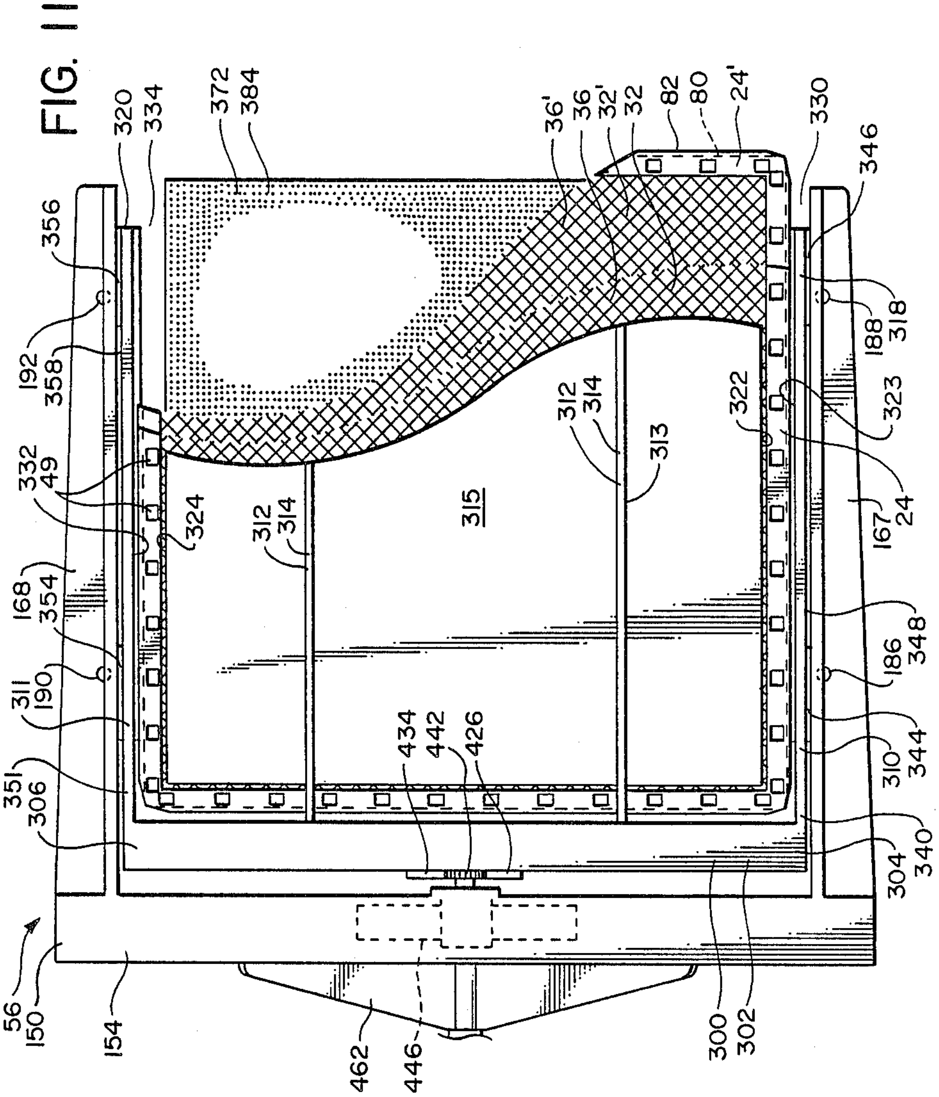
FIG. 11 is a bottom view of the inverter assembly, partially cut away to show a screen tray and compliant material.

In addition, an upward opposing clamping force is provided by a lower platen 300 (FIG. 7) having a rear lower support member 302 horizontally disposed parallel to rear upper support member 152 extending laterally proximate to carrier lower sidearms 167, 168. Extending forwardly from rear support member 302 at opposite ends 304, 306 (FIG. 11) thereof are platen lower support arms 310, 311 disposed parallel to and inboard of carrier lower sidearms 167, 168 and extending longitudinally approximately the length thereof. Disposed inboard of platen lower support arms 310, 311 and extending forwardly from rear lower support member 302 are platen lower longitudinal support members 312, each having an upper surface 313 and a lower surface 314. Attached to upper surface 313 is a lower planar base member 315. Planar base member 315 extends longitudinally beyond an end 320 of platen lower support arm 311, and extends laterally substantially the distance between platen support arms 310, 311. Lower base member 315 includes opposite end surfaces 322, 324. End surface 322 is spaced inward from an imaginary plane extending vertically upward from an inner surface 323 of platen lower support arm 310 to define a channel 330 therebetween; likewise end surface 324 is spaced inward from an imaginary plane extending vertically downward from an inner surface 332 of a support arm 311 to define a channel 334. Channels 330, 334 are sized to receive conveyor chains 22 and conveyor drive sprockets 265 for rotatable movement therein.

In order to slideably engage lower platen 300 to guide shafts 186, 188, 190, 192 between carrier lower sidearms 167, 168 and tray lower support ledges 62, 64 (FIG. 7), respectively, platen lower support arm 310 (FIG. 11) at rear, forward ends 340, 318, respectively thereof, include rear guide block 344, forward guide block 346 attached to an outer surface 348 of platen support arm 310. Rear guide block 344 and forward guide block 346 include passageways (not shown) vertically therethrough for engaging guide shafts 186, 188, respectively, (FIGS. 7 and 11) for vertical slideable movement thereon. Likewise, platen lower support arm 311 at rear, forward ends 351, 320, respectively thereof, includes guide blocks 354, 356 attached to an outer surface 358 of support arm 311. Guide blocks 354, 356 include passageways (not shown) vertically therethrough for engaging guide shafts 190, 192 for vertical slideable movement thereon.

Figure 8:
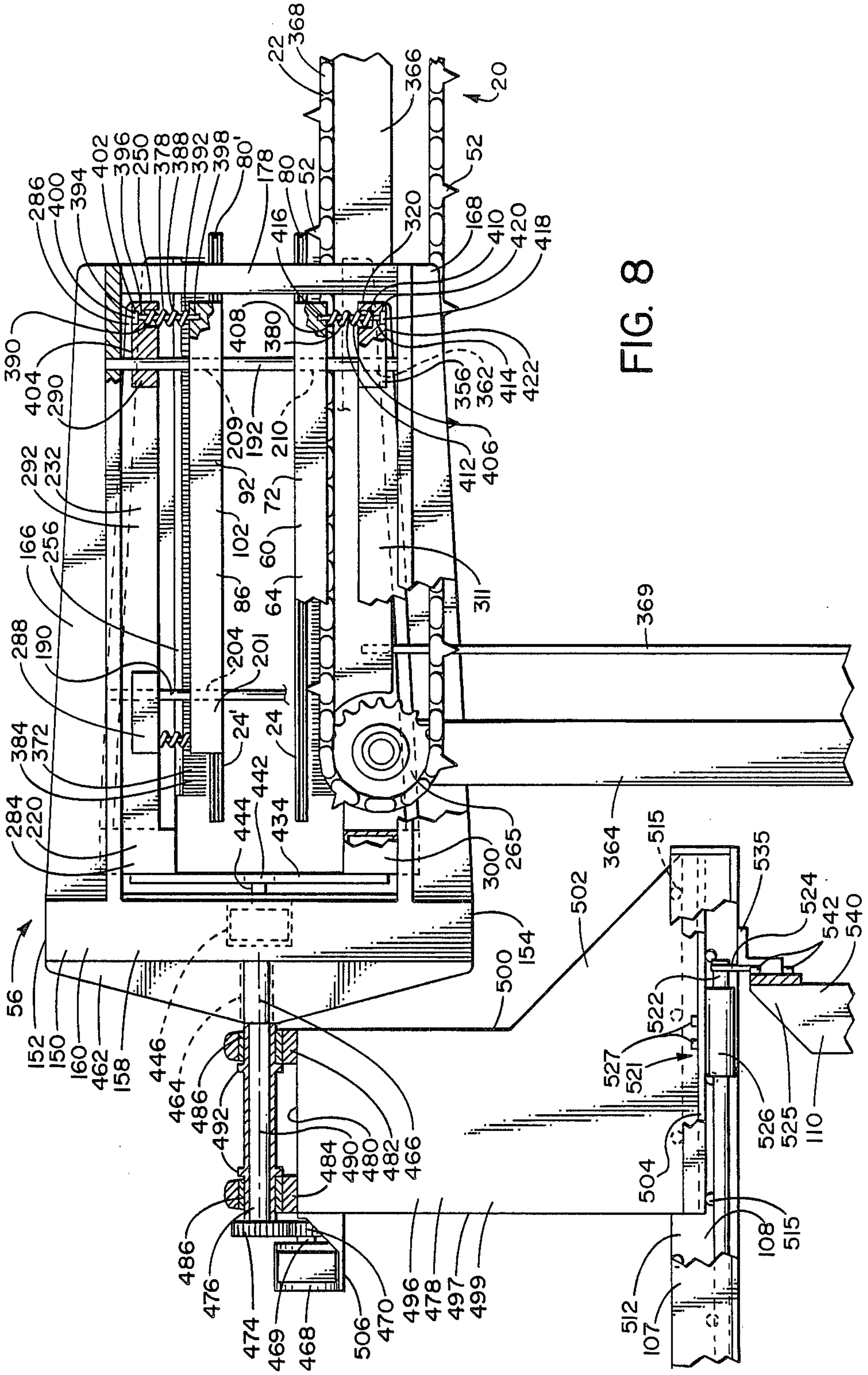
FIG. 8 is a side view showing inverter assembly and lateral mobile assembly, partially cut away to show upper and lower resilient means.
Figure 10:
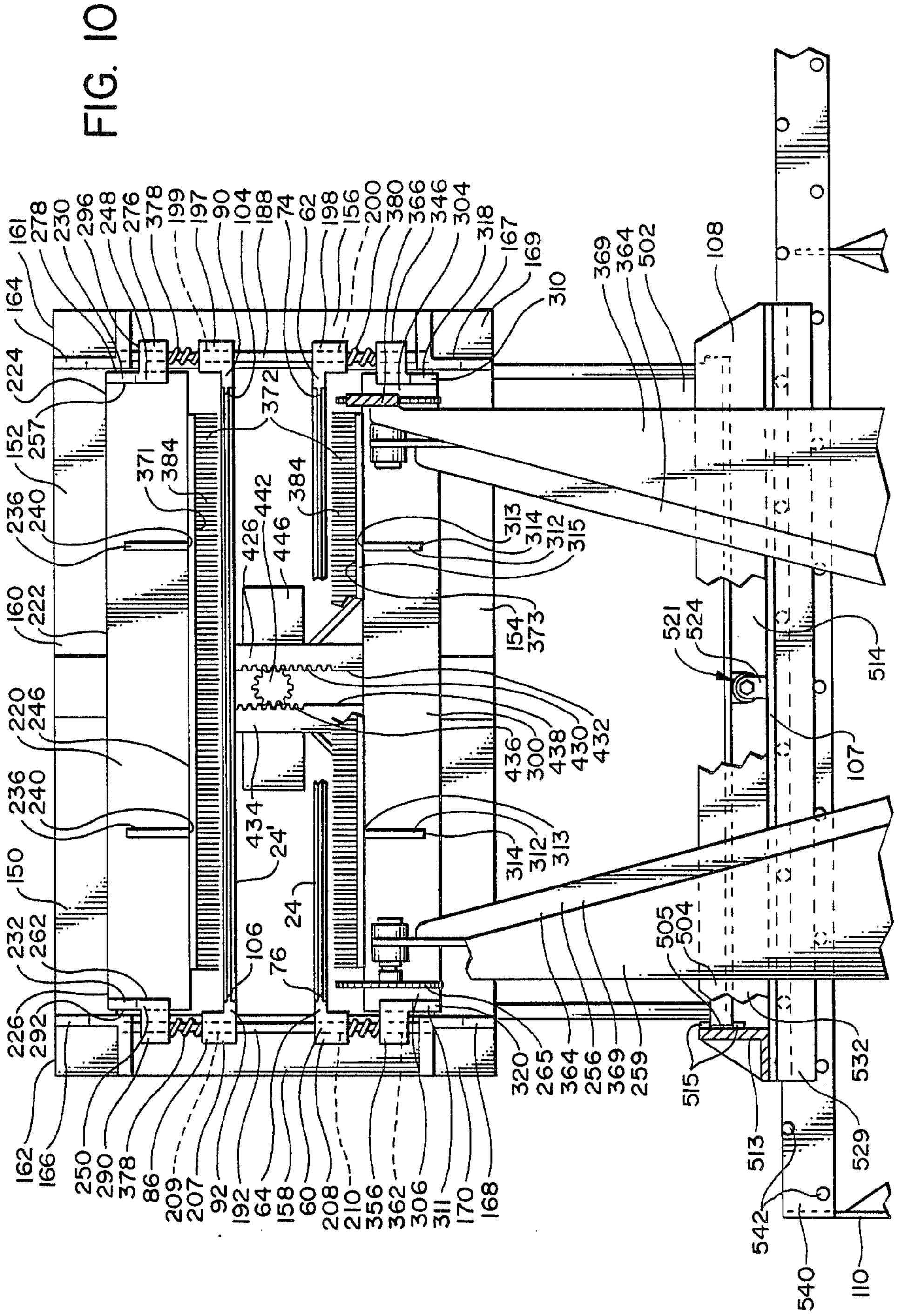
FIG. 10 is a front view of the inverter assembly, lateral mobile assembly, and main support assembly.

Referring to FIGS. 8 and 10, conveyor 20 includes a plurality of sprocket assemblies 265 engaged to conveyor chains 22 for supporting conveyor 20 and causing longitudinal movement thereof. Sprocket assemblies 265 are rotatably mounted to vertical support members 364 which are anchored to the ground. Conveyor chains 22 include a horizontal support floor member 366 disposed below an upper segment 368 of conveyor 20 to prevent sagging thereof due to the weight of conveyor chains 22. Floor member 366 is supported by vertical support members 369 anchored to the ground. Conveyor upper segments 368 (FIG. 8) are disposed above lower platen 300 in alignment with carrier lower support ledges 62, 64 in order to introduce tray slotted channels 80 into receptacle guide rails 74, 76. Trays 24 are bevelled at corners 370 of tray frame 26 in order to assist in guiding trays 24 onto guide rails 74, 76.

As discussed previously, it is desirable that during the inversion of parts 42, 42', that their relative positions remain fixed so that there is no bunching or masking of parts 42, 42' when passing through painting compartment 120 on outbound conveyor line 116 (FIG. 1). When parts 42 are of the same size and shape, the clamping of upper, lower screens 32, 32' may be sufficient to fix the positions of parts 42 during inversion. However, when parts 42 are of different sizes and shapes, such as for example parts 42, 42' shown in FIG. 7, screens 32, 32' will be prevented from further travel in the "clamping" direction of travel by part 42' which has the greater vertical height, thereby leaving part 42 free to move when inverter assembly 56 is rotated to an "inverted" position. In order to retain the relative positions of different sized and shaped parts 42, 42' during rotation of inverter assembly 56, upper base member 246 includes a lower surface 371 for attaching compliant material 372' thereto. Likewise, lower base member 315 includes an upper surface 373 for engaging thereto compliant material 372.

Referring to FIGS. 7 and 10, upper base member 246 and upper tray receptable 86 are maintained in a spaced apart relationship by resilient spacer elements 378 engaged between upper guide blocks 274, 276, 288, 290 and tray upper support ledges 90, 92, respectively. Likewise, lower base member 315 is maintained in a spaced apart relationship from lower tray receptacle 60 by resilient spacer elements 380 engaged between lower guide blocks 344, 346, 354, 356 and lower support ledges 62, 64, respectively. Therefore, as a clamping force is applied to platen upper support arms 230, 232 and platen lower support arms 310, 311 causing them to move vertically toward each other, upper support ledges 90, 92 and lower support ledges 62, 64 engaged therewith by resilient members 378, 380, respectively, are caused to move in a like direction until engaging part 42'. As the downward vertical movement of support ledges 90, 92 and the upward vertical movement of lower support ledges 62, 64 are halted by engagement of part 42' between upper screen 32' and lower screen 32, the upward movement of lower base member 315 and the downward movement of upper base member 246 continues causing resilient members 378, 380 to compress. The clamping movement of upper base members 246 and lower base member 315 continues until the opposing vertical forces caused by compression of resilient members 378, 380 and engagement of parts 42 between compliant material 372, 372' is sufficient to prevent further clamping movement of base members 246, 315. As the clamping movement of upper, lower base members 246, 315 continues after the clamping movement of screens 32', 32 is halted, compliant material 372', 372 is displaced through the holes in screens 32', 32, respectively, to fixedly engage the smaller size parts 42 therebetween. It is desirable therefore that compliant material 372, 372' be sufficiently pliable to penetrate through screens 36, 36' to locations adjacent to and in contact with parts 42, 42', yet be sufficiently rigid to engage parts 42, 42' and to prevent vertical or horizontal movement thereof so that the relative positions of parts 42, 42' are maintained during rotation of inverter assembly 56. When parts 42, 42' are of relatively uneven sizes and shapes, it is preferable to employ nylon bristles or the like, illustrated in FIG. 7, as a compliant material 372', 372 wherein bristles 384 are vertically mounted to upper, lower base members 246, 315 for vertical penetration through screens 36', 36. The lengths of bristles 384 are dependent upon the depth of penetration required through screens 36', 36 to fixedly engage parts 42, 42'. On the other hand, if the parts 42 are of more uniform size and shape, a foam rubber material or the like may be employed as a compliant material 372, 372' due to the fact that the depth of penetration through screens 36, 36' is not as critical.

An additional advantage of the apparatus and methods of the present invention is the engagement of compliant material 372, 372' about parts 42, 42' instead of a rigid material, e.g., metal, to avoid scratching or marring the freshly painted surfaces of parts 42. In addition, the clamping pressure of screens 36, 36' against the largest part 42' may be reduced because the compliant material 372, 372' also engages part 42' to assist in holding it in position.

In an exemplary embodiment illustrated in FIG. 8, each resilient member 378 includes a helical spring 388, having an upper end 390 and a lower end 392, axially disposed about a bolt 394 disposed in a vertical passageway 396 in each upper guide block 274, 276, 288 and 290. Each bolt 394 includes a threaded end 398 engaged to upper support ledges 90, 92, and a head portion 400 engaged within a counterbored passageway 402 in communication with passageway 396 through upper surfaces 404 of upper platen guide blocks 274, 276, 288 and 290. Likewise, each resilient member 380 includes a helical spring 406, having an upper end 408 and a lower end 410, axially disposed about a bolt 412 which is disposed in a vertical passageway 414 in each lower platen guide blocks 344, 346, 354 and 356. Each bolt 412 includes a threaded end 416 engaged to lower support ledges 90, 92 and a head portion 418 engaged within a counterbored passageway 420 in communication with passage 414 through lower surfaces 422 of lower guide blocks 344, 346, 354 and 356. Therefore, as base members 246, 315 travel toward each other in a clamping vertical direction, screens 36, 36' move therewith until the clamping movement of screens 36, 36' is halted wherein base members 246, 315 continue in a clamping direction compressing springs 388, 406 and displacing bolts 394, 412 vertically through counterbored passageways 402, 420.

In order to move base members 246, 315 and screens 36', 36 between the "clamped" and "unclamped" positions, upper platen 220 includes a rack 426 (FIG. 7) depending downwardly from upper rear horizontal support bar 222 and having teeth 430 along an inner edge 432 thereof. Lower platen 300 includes a rack 434 depending upwardly from rear horizontal support 302 having teeth 436 along an inner edge 438 thereof. Teeth 430, 436 of rack members 426, 434, respectively, engage a pinion gear 442 therebetween which is rotated by a shaft 444 (FIG. 8) engaged thereto and disposed in parallel relationship with sidearms 164, 166 of carrier frame 150 so that rotation of pinion gear 442 in a counterclockwise direction, when viewing FIG. 10, causes upward vertical movement of lower platen 300 and downward vertical movement of upper platen 220 to impart to base members 246, 315 and screens 36', 36 movement in the "clamping" direction. Rotation of pinion gear 442 in the clockwise direction causes base members 246, 314 and screens 36, 36' to move vertically to the "unclamped" position. Rotation of pinion gear 442 is effected by a rotary actuator motor 446 via drive shaft 444 fixed to pinion gear 442.

In order to rotate inverter assembly 56 to the "inverted" position, a spider 462 (FIG. 8) is attached to rear frame 160 at rear upper support 152 and rear lower support 154. Spider 462 includes a receptacle 464 through the axial center thereof for engaging a shaft 466 in a fixed relationship therewith. Rotation of shaft 466 is effected by a rotary actuator motor 468 having a drive shaft 469 extending horizontally therefrom, which has a pinion 470 fixed at the distal end thereof. Pinion 470 is rotatably engaged to a gear wheel 474 attached to proximal end 476 of shaft 466. Shaft 466 is supported on an inverter assembly base 478 at an upper surface portion 480. Upper surface portion 480 includes a forward shaft support 482 and a rear shaft support 484 including journal bearings 486 therein to allow rotation of shaft 466 about an axis 490 thereof. Locking collars 492, disposed circumferentially about shaft 466 inboard of shaft supports 482, 484, prevent axial displacement of shaft 466 and inverter assembly 56. Inverter assembly base 478 includes an upper frame portion 496 having a rear support wall 497 and sidewalls 498, 499 (FIG. 9) depending vertically downward from upper surface 480, and a forward support wall 500 (FIG. 8) depending downwardly from upper surface 480 to a location below carrier frame 150, and then depending downwardly and forwardly therefrom to define a lower frame 502 which includes a horizontal bottom support 504 having laterally extending edges 505 and is integrally joined to rear wall 497, sidewalls 498, 499 and forward support wall 500. Rotary actuator motor 468 is secured to a mounting platform 506 which is attached to rear wall 497 of inverter assembly base 478 proximate to upper surface portion 480.

Referring to FIGS. 8 and 10, lower frame 502 is slideably engaged to guide frame 108 of lateral mobile assembly 107. Guide frame 108 includes vertical side portions 512, 513 which define a guide channel 514 having an axis which is disposed parallel to conveyor centerline 109 (FIG. 1). Side portions 512, 513 at the respective inner surfaces thereof, include a plurality of upper and lower rollers 515 for rotatably engaging horizontally extending edges 505 of bottom support flange 504 therebetween. Rollers 515 support inverter assembly base 478 and inverter assembly 56 within guide channel 514 for longitudinal movement between the "engaged" position, illustrated in FIG. 8, wherein the majority of the length of lower tray receptacle 60 is disposed above conveyor chains 22 to receive tray 24 therein, and the "disengaged" position wherein inverter assembly 56 is displaced in a rightward direction, when viewing FIG. 1, away from conveyor chains 22. Displacement of inverter assembly between the "engaged" and "disengaged" positions may be accomplished in a manner know to those of ordinary skill in the art. Preferably however, there is incorporated a rodless linear drive cylinder assembly indicated at 521 which is manufactured by Festo Pneumatic Company, New York. Linear drive assembly 521 includes a cylindrical sleeve portion 522 mounted to main support assembly 110 in a direction parallel to axis 109 (FIG. 1). Sleeve portion 522 is mounted to a forward end of main support assembly 110 by a support arm 524 depending downwardly from sleeve portion 522, and at a rear end (not shown) of main support assembly 110 in a like manner. A cylindrical yoke 526 is slidably engaged to sleeve portion 522 for axial movement thereon. Yoke 526 is engaged to flange 504 of inverter assembly base 478 by bolts 527. Sleeve portion 522 axially encloses a double acting piston therein (not shown) which includes a magnetic portion which is magnetically coupled to yoke 526 so that axial movement of the double acting piston within the sleeve portion 522 by a liquid or gas acting against the piston, causes axial movement of yoke 526 and inverter assembly base 478/inverter assembly 56 therewith Lateral mobile assembly 107 (FIG. 10) includes a pair of downwardly depending parallel support flanges 529 (only one of which is shown) which define a guide channel having an axis perpendicular to the axis of guide channel 514. Lateral mobile assembly 107 is slideably engaged within and supported by main support assembly 110 along guide frame 112 thereof. Guide frame 112 includes a pair of parallel support sidewalls 540 (only one of which is shown) having a plurality of upper and lower rollers 542 for rotatably engaging support flanges 529 at respective upper and lower surfaces thereof Rollers 542 support lateral mobile assembly 107 for longitudinal slideable movement therealong between station C, aligned with conveyor line 20, and station D, aligned with conveyor line 116 (FIG. 1). Displacement of lateral mobile assembly 107 between station C and station D is accomplished in a manner known to those of ordinary skill in the art; however preferably a linear drive cylinder assembly is utilized which is similar to drive cylinder assembly 521 described previously with reference to displacement of inverter assembly 56 between the "engaged" and "disengaged" positions.

Other embodiments not disclosed herein, but which are encompassed within the spirit and scope of the present invention as disclosed herein are also included as part of the present application.

What is claimed is:

1. Apparatus for engaging a workpiece having first and second surfaces, sadis apparatus comprising:

a. first and second workpiece engaging means disposed in a spaced apart relationship, said first engaging means having a first surface, a second surface, and at least one through opening extending between said first and second surfaces;

b. means for positioning said first and second engaging means to engage said first and second surfaces, respectively, of said workpiece between said second surfaces of said first engaging means and said second engaging means;

c. means to move compliant means through said opening at said first surface of said first engaging means in a first direction such that said compliant means extends through said opening and beyond said second surface of said first engaging means to engage said workpiece;

d. said compliant menas and said first engaging means being slidably engaged to a support member of a frame means; and e. said first engaging means including resilient means disposed between a noncompliant portion of said compliant means and said first surface of said first engaging means so that said movement of said compliant means in said first direction engages said resilient means between said compliant means and said first engaging means to cause a corresponding movement of said first engaging means in said first direction to engage said workpiece between said first engaging means and said second engaging means thereby restricting further movement of said first engaging means in said first direction, said movement of said compliant means continuing in said first direction to cause (i) compression of said resilient means between said noncompliant portion and said first surface, and (ii) penetration of said compliant means through said opening extending between said first and second surfaces.

2. An apparatus for engaging and rotating a workpiece, having first and second surfaces, so that a surface operation can be performed on said first and seocnd surfaces, said apparatus comprising:

a. first and second workpiece engaging means disposed in a spaced apart relationship, said first engaging means having a first surface, a second surface and at least one through opening extending between said first and second surfaces;

b. means for positioning said first and second engaging means, after a surface operation has been peormed on said first surface of said workpiece, to engage said first and second surfaces, respectively, of said workpiece between said second surface of said first engaging means and said second engaging means;

c. means for moving a compliant means operatively connected to said first engaging means, in a first direction through said opening at said first surface of said first engaging means in a manner that said compliant means extends through said opening and beyond said surface to engage said workpiece and hold said workpiece securely relative to said first and second engaging means;

d. means for rotating said first and second engaging means and said compliant means in engagement with said workpiece to invert said workpiece;

e. means for moving said compliant means away from said workpiece so that said compliant means is disengaged from said workpiece;

f. means for positioning said first and second engaging means to disengage said workpiece from between said second surface of said first engaging means and said second engaging means in preparation for performance of a surface operation on said second surface;

g. said first engaging means includings resilient means disposed between a noncompliant portion of said compliant means and said first surface of said first engaging means so that said movement of said compliant means in said first direction engages said resilient means between said compliant means and said first engaging means to cause a corresponding movement of said first engaging means in said first direction to engage said workpiece between said first engaging means and said second engaging means thereby restricting further movement of said first engaging means in said first direction, said compliant means continuing in said first direction to cause (i) compression of said resilient means between said noncompliant portion and said first surface of said first engaging means, and (ii) penetration of said compliant means through said opening extending between said first and second surfaces of said first engaging means.

3. The apparatus as set forth in claim 2 wherein said compliant means and said first engaging means are slideably engaged to a support member.

4. An apparatus for engaging and rotating a workpiece having first and second surfces 50 that a surface operation can be performed on said first and second surfaces, said second surface of said workpiece being removably supported on a first surface of a first platform, said first paltform also having a second surface and at least one through opening extending between said first and second surfaces, said apparatus comprising:

a. first platform engaging means for removably engaging said first platform after a surface operation has been performed on said first surface of said workpiece;

b. second platform engaging means having a second platform removably engaged thereto, said second platform being disposed in a spaced apart relationship from said first platform;

c. positioning means for positioning said first and second platform engaging means so that said second platform engages said first surface of said workpiece;

d. moving means for moving compliant means which are operatively connected to said first platform engaging means in a first direction through said opening of said first platform in a manner that said compliant means extends beyond said first surface of said first platform to engage said workpiece and to hold said workpiece securely relative to said first and second platforms;

e. means for rotating said first and second platform engaging means and said compliant means to invert said workpiece so that said first surface of said workpiece is supported on said second platform;

f. said moving means also being arranged for moving said compliant means away from said workpiece so that said compliant means is dinsengaged from said workpiece;

g. said positioning means also being arranged for positioning said first and second platform engaging means so that said first platform is disengaged from said workpiece to permit said second platform to be disengaged from said second platform engaging means in preparation for performance of a surface operation on said second surface of said workpiece;

h. said first platform engaging means including resilient means disposed between a noncompliant portion of said compliant means and said first platform so that said movement of said complaint means in said first direction engages said resilient means beween said compliant means and said first platform to cause a corresponding movement of said first platform in said first direction to engage said workpiece thereby restricting further movement of said first platform in said first direction, said compliant means continuing in said first direction to cause (i) compression of said reslient means between said noncompliant portion and said first platform and (ii) penetration of said compliant means through said opening extending betwene said first and second surfaces of said first platform.

5. The apparatus as set forth in claim 4 wherein said second platform engaging means remvoably engages said second platform which includes first and second surfaces and at least one through opeing extending between said first and second surfaces of said second platform so tht said rotation of said first and second platform engaging means and said inversion of said workpiece causes said workpiece to be supported on said second platform in preparation for disengaging said second platform from said second platform engaging means in performance of said surface operation on said second surface of said workpiece.

6. The apparatus as set forth in claim 5 additionally comprising:

a. means for moving a second compliant means operatively connected to said second platform engaging means in a second direction opposite to said first direction through said opening of said second platform in a manner that said second compliant means extends through said opening and beyond said second platform to engage said workpiece; and b. means for moving said second compliant means away from aid workpiece so that said second compliant means is disengaged from said workpiece.

7. A method for engaging a workpiece comprising the steps of:

a. placing first and second workpiece engaging means in a spaced apart relationship from the workpiece, the first workpiece engaging means having a first surface, a second surface and at least one through opening extending between the first surface and the second surface;

b. moving a compliant means in a first direction against a resilient means disposed between a noncompliant portion of the compliant means and the first engaging means to engage the first engaging means and to cause the first engaging means to move in the first direction to engage the workpiece between the first engaging means and the second engaging means in a manner that further movement of the first engaging means in the first direction is restricted; and c. continuing to move the compliant means in the first direction to compress the resilient means between the noncompliant portion and the first engaging means so that the compliant means penetrates through the opening and beyond the second surface of the first engaging means to engage the workpiece and to hold the workpiece securely relative to the first and second workpiece engaging means.

8. Apparatus for engaging (i) a first workpiece having a first thickness diemnsion which is measured between a first and a second surface of the first workpiece, and (ii) a second workpiece having a second thickness dimension which is less than the first thickness dimension, and which is measured between a first and second surface of the second workpiece, the apparatus comprising:

a. first and second engaging means disposed in a spaced apart relationship, the first engaging means having a first surface, a second surface and at least one through opening extending betwene the first and second surfaces;

b. means for securing the second workpiece, the securing means including (i) frame means, and (ii) a plurality of projection members which extend from the frame means; and c. closing means including:

(1) means for positioning the first and second engaging means to engage the first and seocnd surfaces of the first workpiece between the second surface of the first engaging means and the second engaging means, and (2) means for moving the frame means so as to move the projection members thorugh the opening at the first surface of the first engaging means so that the projection members extend past the first surface of the first workpiece to engage the first surface of the second workpiece.

* * * * *